April 26, 1949.　　　　J. D. TEAR　　　　2,468,137
GYRO-STABILIZER APPARATUS
Filed Oct. 5, 1945　　　　　　　　　　　　2 Sheets-Sheet 1
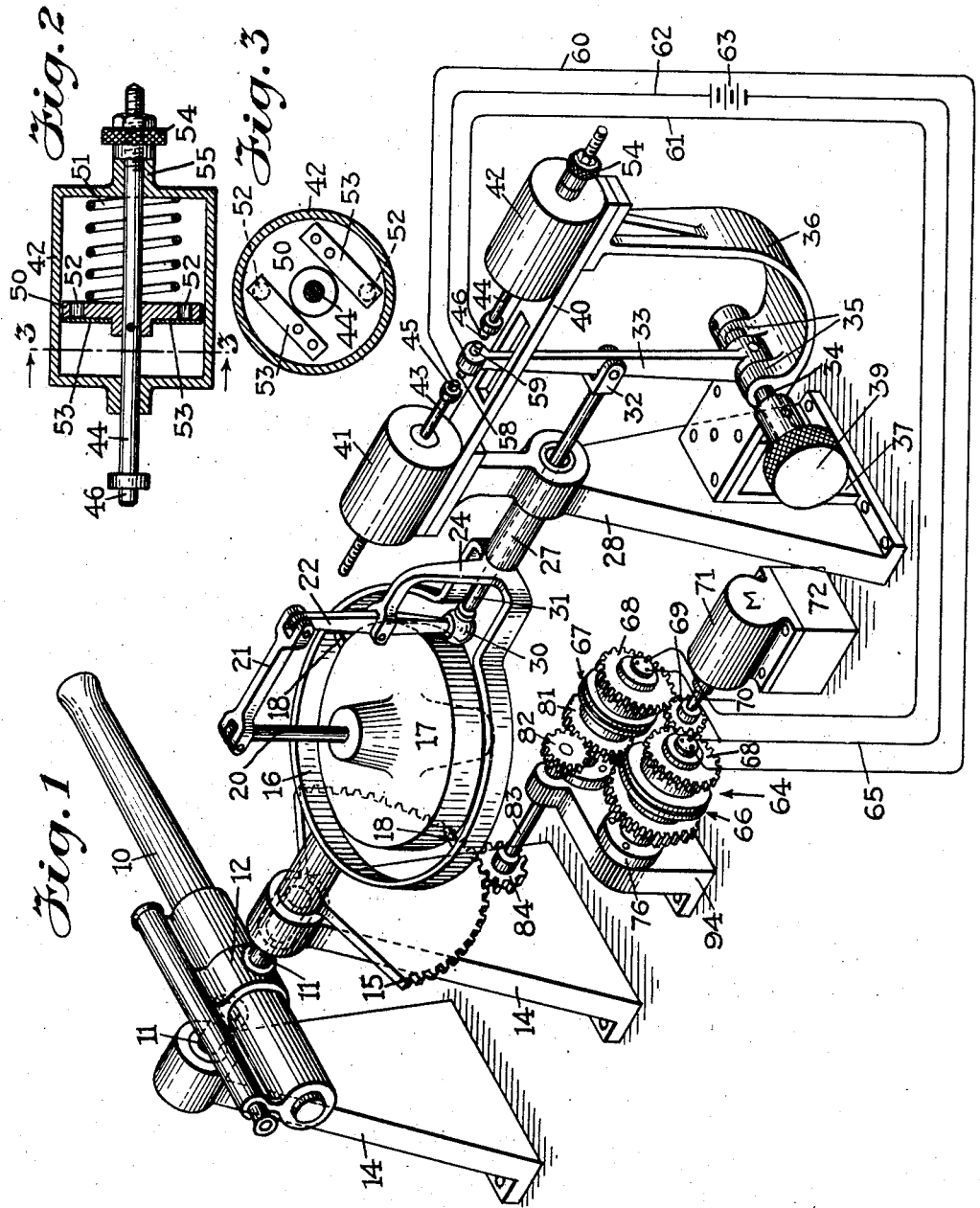
INVENTOR
JAMES D. TEAR
ATTORNEY April 26, 1949.  J. D. TEAR  2,468,137
GYRO-STABILIZER APPARATUS
Filed Oct. 5, 1945  2 Sheets-Sheet 2

INVENTOR
JAMES D. TEAR
ATTORNEY

Patented Apr. 26, 1949

2,468,137

UNITED STATES PATENT OFFICE 2,468,137

GYRO-STABILIZER APPARATUS

James D. Tear, Great Neck, N. Y., assignor to The Sperry Corporation, a corporation of Delaware Application October 5, 1945, Serial No. 620,581

8 Claims. (Cl. 74—5.4)

This invention relates to a gyroscopically controlled stabilizing apparatus and more particularly to a quick acting stabilizing apparatus for use on supports or platforms such as tanks or the like which are subject to high angular acceleration and irregular angular movement.

An object of the invention is to provide a stabilizing apparatus of the above type having novel and improved operating characteristics.

Another object is to provide a gyroscopically controlled stabilizing apparatus having a servo unit which supplements the stabilizing torque of the gyroscope and thereby eliminates any substantial reaction on the gyroscope from the member being stabilized.

Another object is to provide a novel and improved reversible magnetic clutch mechanism especially suited for aiding the stabilizing effect of the gyroscope when required but otherwise not reacting to any appreciable extent upon the gyroscope.

Various other objects and advantages will be apparent as the nature of the invention is more fully disclosed.

In accordance with the present invention, the member to be stabilized, such as a gun, sight, searchlight or the like, is mounted in a normally balanced position on an axis on an angularly moving platform, such as a tank, and is mechanically connected directly to a control gyroscope in such a way that the inertia of the member and the stabilizing effect of the gyroscope both tend to maintain the member in a stabilized condition. The gyroscope is mounted on the member about an axis normal to the mounting axis of the member so that the gyroscope is free to precess due to stabilizing reaction torques. The slightest angular movement of the member about its mounting axis results in precession of the gyroscope in one direction or the other from a neutral position. This precessional movement actuates a quick acting power servo unit such as magnetic clutches to apply torques to the member to oppose the movement of the member and thereby to substantially eliminate reaction on the gyroscope from the stabilized member and to cause the gyroscope to precess back to its neutral position. The gyroscope acts as a gyrometer to measure the rate of angular movement of the stabilized member and the servo unit is controlled thereby in such a way that the torque applied to the member is proportional to the displacement of the gyroscope from its neutral position, therefore, the opposing torque applied by the servo unit is reduced as the velocity of the stabilized member approaches zero.

Although the novel features which are believed to be characteristic of this invention are pointed out more particularly in the claims appended hereto, the invention itself will be better understood by referring to the following description taken in connection with the accompanying drawings in which a specific embodiment thereof has been set forth for purposes of illustration.

In the drawings:

Fig. 1 is a perspective view of a gyroscopically controlled stabilizing mechanism embodying the present invention;

Fig. 2 is a detail view of one of the yieldably mounted contacts shown in Fig. 1;

Fig. 3 is a transverse section taken on the line 3—3 of Fig. 2;

Figure 4:
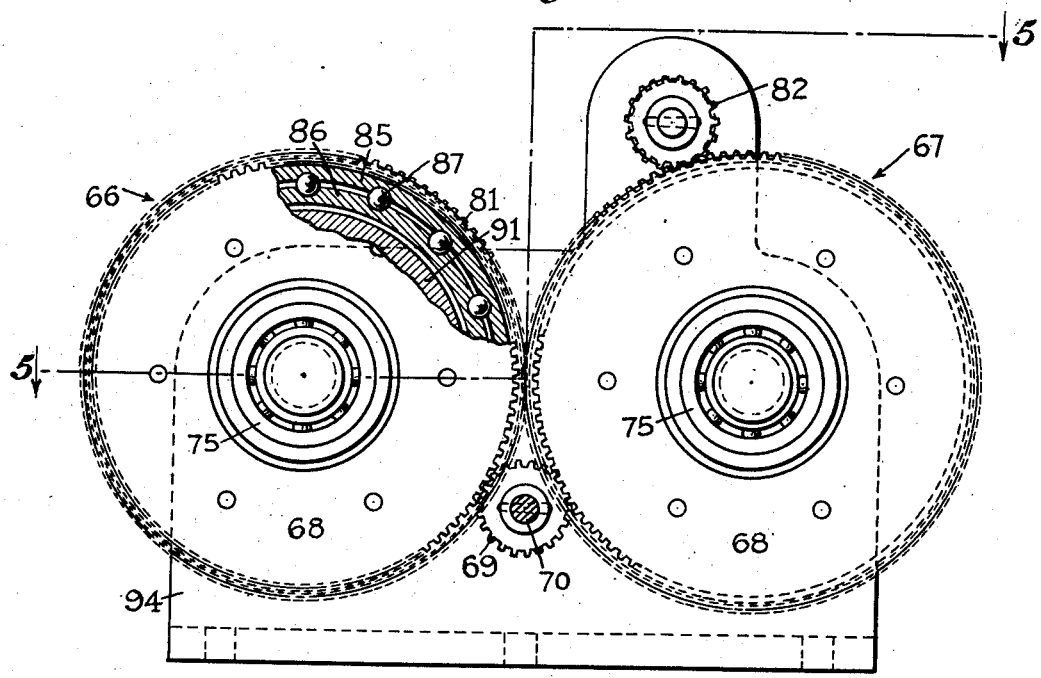
Fig. 4 is an end elevation, partly in section, of the servo unit.

Referring to the drawings more in detail, the mechanism is connected to stabilize a member 10, shown as a gun. The member 10 may, however, be taken to represent any other stabilized element such as a sight, searchlight, or the like. The member 10 is shown as mounted on trunnions 11 by means of a collar 12 which is so positioned that the member is normally balanced about the axis of the trunnions 11. The trunnions 11 are mounted in brackets 14 and one trunnion carries a segmental gear 15 and a gimbal ring 16 of a gyroscope 17. The gyroscope 17 is shown as mounted in the gimbal ring 16 by trunnions 18, the axis of which extends normal to the axis of the trunnions 11 so that the gyroscope is free to precess in the plane of the trunnions 11 but is constrained to move with the member 10 about the axis of the trunnions 11.

The gyroscope 17 is shown as provided with a pin 20 which extends coaxially with the spin axis of the gyroscope and is attached by a link 21 to a lever 22. The lever 22 is pivotally supported on an arm 24 which is rigidly attached to the gimbal ring 16. The gimbal ring 16 is provided with a hollow trunnion 27 which is journaled in a bracket 28 about an axis coaxial with the axis of the trunnions 11.

The lever 22 is connected by a ball and socket connection 30 to a rod 31 which extends through the trunnion 27 and at its free end carries a yoke 32 which is attached to a lever 33. The lever 33 is attached to a pin 34, journaled in bearings 35 carried by a bracket 36 which is attached to an angle member 37 secured to the bracket 28. The pin 34 carries an adjusting knob 39 by means of which a torque may be applied manually to the pin 34 and to the lever 33.

A support 40 is attached to the brackets 28 and 36 and carries cylinders 41 and 42 carrying rods 43 and 44 respectively provided with contacts 45 and 46. The cylinders 41 and 42 are similar in construction. Cylinder 42 is shown in detail in Figs. 2 and 3 as having a piston 50 slidably mounted therein and attached to the rod 44. A spring 51 normally holds the piston 50 and rod 44 in extended position, but permits the same to be retracted by pressure applied against the contact 46. The piston 50 is provided with ports 52, closed by flap valves 53 which are shown as flat spring members mounted so as to permit the piston 50 to be freely moved in response to pressure exerted on the contact 46, but to dampen the movement of the piston in the reverse direction. The movement of the rod 44 is limited by an adjusting nut 54 which is threaded on to the end of the rod 44 and bears against a boss 55 on the end of the cylinder 42.

Although the piston 50 is freely movable in one direction subject only to the force required to compress the spring 51, the return movement is dependent upon the pressure exerted by the compression of the spring and by the dampening effect of the flap valves 53 which retard the flow of air through the ports 52 of the piston. Inasmuch as the force exerted by the spring 51 tends to decrease as the spring returns to its normal position, it is evident that the rate of movement of the piston likewise decreases. Hence the rate of return of the piston 50 and of the rod 44 becomes proportional to the displacement and decreases as the piston approaches its normal position.

Figure 5:
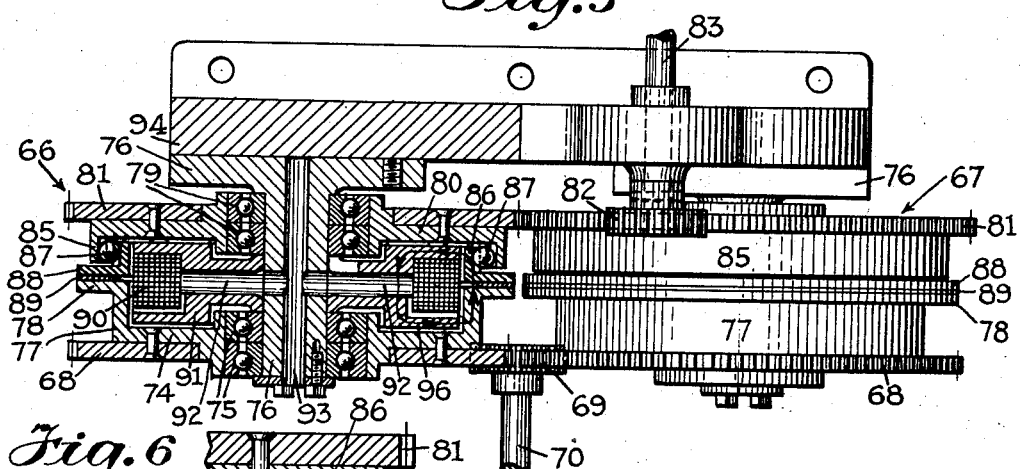
Fig. 5 is a transverse section taken on the line 5—5 of Fig. 4.

The lever 33 carries contacts 58 and 59 which are adapted respectively to engage contacts 45 and 46 as the lever 33 is shifted from its central position in one direction or the other. Contacts 45 and 46 are connected to conductors 60 and 61 and contacts 58 and 59 are connected to a conductor 62 which is connected to a power supply 63. The conductors 60 and 61 are connected to control a magnetic clutch mechanism 64 which is shown more in detail in Figs. 4 and 5. A return conductor 65 connects the clutch mechanism to the power supply 63.

The clutch mechanism comprises a pair of units 66 and 67 each of which comprises a spur gear 68 driven by a pinion 69 carried by a driving shaft 70. The shaft 70 is driven by a motor 71 mounted on a suitable bracket 72 (Fig. 1). The connection is such that both gears 68 rotate in the same direction.

The gear 68 of each unit is attached to a driving ring 74 which is journalled by means of ball bearings 75 for rotation about a stationary support 76. The driving rings 74 are made of magnetic material such as iron and each carries a peripheral flange 77 terminating in a radial flange 78.

Each unit also includes a driven ring 80 of magnetic material attached to a spur gear 81 which is mounted by ball bearings 79 to rotate about the support 76, the gears 81 of the two units mesh with each other and the gear 81 of unit 67 (Fig. 1) meshes with a pinion 82 carried on a driven shaft 83 which carries a pinion 84 meshing with the segmental gear 15. The driven ring 80 carries a peripheral flange 85 which extends toward the flange 78 of the driving ring 74. A floating ring 86 is attached to the driven ring 80 by means of balls 87 which are arranged to cause the driven ring 80 to rotate with the floating ring 86, but permit free movement of the ring 86 toward or away from the flange 78 of the driving ring 74. The floating ring 86 is provided with a radial flange 88 substantially coextensive with the radial flange 78 and provided with a friction surface 89 of suitable material such as cork to provide a friction grip with the flange 78 when the clutch is energized.

Figure 6:
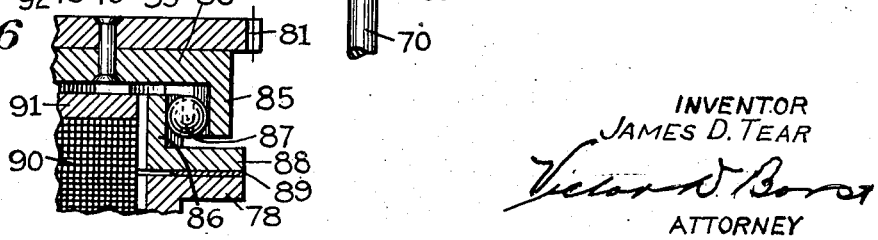
Fig. 6 is an enlarged detail view of a part of the clutch mechanism.

The balls 87 are mounted in semi-cylindrical axial recesses in the floating ring 86 and corresponding recesses in the flange 85 which provide for free lateral movement of the ring 86, but constrain the same to rotate with the driven ring 80 as shown in detail in Fig. 6.

An annular coil 90 is carried in a recess in an annular bracket 91 which is secured on the support 76 between the bearings 75 and 79. The bracket 91 is likewise made of magnetic material and is provided with ducts 92 communicating with a duct 93 in the support 76 which provides space for the electrical connections (not shown in Fig. 5) to the coil 90.

The supports 76 are attached to a stationary bracket 94 carrying the shaft 83 (Fig. 1). The conductors 60 and 61 are connected to the coils 90 of the respective units 66 and 67 and the return conductor 65 is connected to both of the coils 90, so that one or the other of said coils is energized as the contacts 45 and 46 are respectively closed.

Operation

In the operation of this device the inertia of the stabilized member 10 is such that it tends to maintain its angular position in space about trunnions 11 regardless of any sudden angular movement of its support about the axis of the trunnions 11. Since the member is directly connected to the gimbal ring 16 of the gyroscope 17 the stabilizing effect of the gyroscope is added to the inertia of the member and helps to stabilize the same.

If the stabilizing effect of the inertia of the member and the angular momentum of the gyroscope is not sufficient to maintain a stable condition, the gimbal ring 16 tends to rotate about the axis of the trunnions 11 and 27 thereby applying a precessing torque to the gyroscope which causes it to precess about the trunnions 18 in one direction or the other. This precession of the gyroscope, through the link 21, lever 22 and rod 31, will cause a corresponding pivotal movement of the lever 33 about the pin 34 and will close either the contact 45 or the contact 46.

After contact 45 or 46 is closed, further movement of the lever 33 causes axial movement of the rod 43 or 44 as the case may be against the force of the spring 51. The spring 51 is designed to yield under a very slight pressure so as to avoid exerting a reaction on the gyroscope. Hence contact 45 or 46 remains in control of the respective clutch member until the tendency of the member to rotate in space about trunnions 11 has been overcome by the servo mechanism in the manner to be described.

Closing of contact 45 or 46 energizes the coil 90 of one or other of the units 66 and 67. A magnetic circuit is set up by the coil 90 which extends from the stationary bracket 91 to the flanges 77 and 78 of the driving ring 74, thence through the floating ring 86, thence back to the stationary bracket 91 as indicated by the arrows on the line 96 in Fig. 5. This magnetic circuit causes the friction surface 89 on the radial flange 88 of the floating ring 86 to be drawn against the radial flange 78 of the driving ring 74, thus applying a torque to the driving ring 80 and the gear 81.

When the coil 90 of the unit 66 is energized its gear 81 applies a torque to the gear 81 of the unit 67 which now operates as an idler gear and applies the torque to the pinion 82, shaft 83, pinion 84, and the segmental gear 15. If, on the other hand, the coil 90 of the unit 67 is energized, the pinion 82 is actuated directly from its gear 81 so that the shaft 83 and segmental gear 15 receive a torque acting in the opposite direction. A torque is thus applied to the gear 15 in a direction to aid the gyroscope in opposing angular movement in space of the member 10 about trunnions 11 and to restore the lever 33 to its neutral or mid position when the tendency is fully overcome.

If the rate of precession of the gyroscope toward its neutral position caused by the torque applied by the servo unit as above described is sufficient to cause the lever 33 to move at a greater rate than the return rate of the contact 45 or 46, the contacts are broken and therefore the applied torque becomes zero until the contact 45 or 46 has moved sufficiently to again energize the servo unit. The rate of return of the contact 45 or 46 is under the control of the spring 51 and the dampening effect of the piston 50. Hence as the contact 45 or 46 approaches its neutral position, the rate of movement decreases as above described and therefore the opposing torque applied to the member 10 by the clutch mechanism 64 likewise decreases due to the successive energization and release of the magnetic clutch as the lever 33 breaks and makes contact with the contact 45 or 46.

Since the displacement of the gyroscope from its neutral position is a measure of the rate of angular movement of the member 10 about trunnions 11 it follows that the opposing torque applied by the servo unit is likewise proportional to the rate of such movement.

It is to be noted that the construction of the magnetic clutch is such that it does not produce any appreciable torque on the gyroscope when the coils 90 are both de-energized, as the floating rings 86 are then free to rotate with respect to the driven rings 74, but that the stabilizing torque is applied instantly upon energization of either of the clutches so that a quick acting and accurate servo action is obtained.

The stabilized position of the member 10 may be manually set or adjusted by applying a torque to the knob 39. This torque operates through the mechanical linkages to apply a precessing torque to the gyroscope about trunnions 18 which causes the gyroscope to precess about the axis of the trunnions 11 and 27 to change the angular position of the member 10. If the gyroscope does not precess at a sufficiently rapid rate, the torque applied to the knob 39 will cause either the contact 45 or 46, as the case may be, to be closed so as to actuate the servo unit to assist the gyroscope in moving the member 10 to the desired position. Thereafter, when the torque is removed from the knob 39, the lever 33 will assume its neutral position after which the member will be stabilized in the manner above set forth.

Although a specific embodiment of the invention has been shown for purposes of illustration it is to be understood that various changes and adaptations may be made therein as will be readily apparent to a person skilled in the art. The invention is only to be restricted in accordance with the scope of the following claims.

What is claimed is:

1. A gyroscopically controlled stabilizing mechanism, comprising a member mounted for angular movement about an axis on an angularly moving platform, a gyroscope pivotally mounted on the member for precessing movement about an axis normal to said first axis and constrained to fixed angular relation to the member about said first axis so as to exert a stabilizing torque on the member, a servo unit including means adapted to apply a torque to the member about said first axis, control circuits for the servo unit including control elements, means responsive to precessing movement of the gyroscope to actuate the control elements to cause the servo unit to aid the gyroscope in stabilizing the member, and manually operated means for applying a precessing torque to the gyroscope about said normal axis to adjust the stabilized position of the member.

2. A gyroscopically controlled stabilizing mechanism, comprising a member mounted for angular movement about an axis on an angularly moving platform, a gyroscope pivotally mounted on the member for precessing movement about an axis normal to said first axis and constrained to fixed angular relation to the member about said first axis so as to exert a stabilizing torque on the member, a servo unit including means adapted to apply a torque to the member about said first axis, control circuits for the servo unit including control elements, means responsive to precessing movement of the gyroscope from a neutral position to actuate the control elements for causing the servo unit to aid the gyroscope in stabilizing the member, means associated with the control elements to limit the average torque applied to the member by the servo unit in accordance with the extent of the precessing movement of the gyroscope from its neutral position, and manually operated means for applying a precessing torque to the gyroscope about said normal axis to adjust the stabilized position of the member.

3. A gyroscopically controlled stabilizing mechanism, comprising a member mounted for angular movement about an axis on an angularly moving platform, a gyroscope mounted on the member for precessing movement about an axis normal to the first axis and constrained to fixed angular relation to the member about said first axis so as to exert a stabilizing torque on the member, a servo unit including means adapted to apply a torque to the member about said first axis, control circuits for the servo unit including control elements, means responsive to precessing movement of the gyroscope from a neutral position to actuate the control elements for causing the servo unit to aid the gyroscope in stabilizing the member, means to reduce the average torque of the servo unit applied to the member as the displacement of the gyroscope from its neutral position is reduced, and manually operated means for applying a precessing torque to the gyroscope about said normal axis to adjust the stabilized position of the member.

4. A gyroscopically controlled stabilizing mechanism, comprising a member mounted for angular movement about an axis on an angularly moving platform, a gyroscope mounted on the member for precessing movement about an axis normal to said first axis and constrained to fixed angular relation to the member about said first axis so as to exert a stabilizing force on the member, a reversible servo unit comprising a continuously operating driving motor and friction clutch means releasably connecting the motor to apply a torque to the member in a direction to aid the gyroscope in stabilizing the member, and means responsive to precessing movement of the gyroscope to actuate said clutch means.

5. A gyroscopically controlled stabilizing mechanism, comprising a member mounted for angular movement about an axis on an angularly moving platform, a gyroscope mounted on the member for precessing movement about an axis normal to said first axis and constrained to fixed angular relation to the member about said first axis so as to exert a stabilizing torque on the member, a reversible servo unit comprising a driving motor and clutch means releasably connecting the motor to apply a torque to the member in a direction to aid the gyroscope in stabilizing the member, means responsive to precessing movement of the gyroscope from a neutral position to actuate the clutch means, and means responsive to the rate of return of the gyroscope to its neutral position to release the clutch when said rate exceeds a predetermined value.

6. A gyroscopically controlled stabilizing mechanism, comprising a member mounted for angular movement about an axis on an angularly moving platform, a gyroscope mounted on the member for precessing movement about an axis normal to said first axis and constrained to fixed angular relation to the member about said first axis so as to exert a stabilizing torque on the member, a reversible servo unit comprising a continuously operating driving motor and friction clutch means releasably connecting the motor to apply a torque to the member in a direction to aid the gyroscope in stabilizing the member, and means responsive to the direction and magnitude of the precessing movement of the gyroscope from a neutral position to actuate the clutch means in a manner to control the direction and amount of torque applied to the member.

7. A gyroscopically controlled stabilizing mechanism, comprising a member mounted for angular movement about an axis on an angularly moving platform, a gyroscope mounted on the member for precessing movement about an axis normal to said first axis and constrained to fixed angular relation to the member about said first axis so as to exert a stabilizing torque on the member, a reversible servo unit comprising a driving motor and a magnetic clutch means releasably connecting the motor to apply a torque to the member in a direction to aid the gyroscope in stabilizing the member, clutch control circuits including a movable contact actuated by the precessing movement of the gyroscope and cooperating contacts, means mounting said last mentioned contacts to permit movement thereof from a biased neutral position by the movable contact in response to precessing movement of the gyroscope, and means retarding the return of said contacts to their neutral position, whereby the torque applied to the member by the servo unit is proportional to the displacement of the contacts from their neutral position.

8. A gyroscopically controlled stabilizing mechanism, comprising a member mounted for angular movement about an axis on an angularly moving platform, a gyroscope mounted on said member for precessing movement about an axis normal to said first axis and constrained to fixed angular relation to the member about said first axis so as to exert a stabilizing torque on the member, a reversible servo unit comprising a driving motor and clutch means releasably connecting the motor to apply a torque to the member in a direction to aid the gyroscope in stabilizing the member, clutch control circuits including a movable element actuated by the precessing movement of said gyroscope and cooperating elements, means mounting said last mentioned elements to permit movement thereof from a biased neutral position by the movable element in response to precessing movement of the gyroscope, and means retarding the return of the elements to their neutral position.

JAMES D. TEAR.

REFERENCES CITED

The following references are of record in the file of this patent:

UNITED STATES PATENTS

| Number | Name | Date |
| --- | --- | --- |
| 754,291 | Eastwood | Mar. 8, 1904 |
| 1,151,762 | Day | Aug. 31, 1915 |
| 1,169,937 | Dikeman | Feb. 1, 1916 |
| Re. 14,435 | Sperry | Feb. 19, 1918 |
| 1,642,087 | Rosenbaum | Sept. 13, 1937 |
| 1,722,302 | Lamb | July 30, 1929 |
| 1,765,670 | Herr | June 24, 1930 |
| 1,906,719 | Richter | May 2, 1933 |
| 1,909,918 | Tanner | May 16, 1933 |
| 2,046,735 | Frisch et al. | July 7, 1936 |
| 2,389,775 | Hanna et al. | Nov. 27, 1946 |